Dec. 7, 1971  J. LEVEQUE  3,625,101
WIRE-CUTTING MACHINE
Filed March 31, 1970  3 Sheets-Sheet 1

United States Patent Office 3,625,101
Patented Dec. 7, 1971

3,625,101
WIRE-CUTTING MACHINE
Jean Leveque, Paris, France, assignor to Commissariat a l'Energie Atomique, Paris, France
Filed Mar. 31, 1970, Ser. No. 24,217
Claims priority, application France, Apr. 4, 1969, 6910211
Int. Cl. B23d 25/00
U.S. Cl. 83—355      4 Claims

ABSTRACT OF THE DISCLOSURE

The machine makes it possible to cut a wire by shearing at a precise point along the length of the wire without subjecting this latter to any longitudinal stress. Two rotary cutters mounted on the ends of the driving shafts of two impulse or stepping motors carry out identical movements but in opposite directions, the driving shafts being disposed on each side of the wire to be cut at an opposite angle of inclination with respect to the wire.

---

This invention relates to a mechanical cutting machine which makes it possible to cut a wire by shearing at a precise point along the length of the wire without thereby subjecting this latter to any longitudinal stress. Although other applications may be contemplated, the invention is of particular interest for cutting a wire which is intended to be employed in the construction of some types of magnetic memory or storage elements. To this end, the wire has a metallic core and a coating which is also metallic is deposited on said core in an electroplating bath, thereby endowing the wire with the necessary magnetic properties. The wire is usually fed through the plating bath at a constant speed and cut as it passes out of the bath so as to constitute samples of satisfactory length. Alternatively, the wire is cut at precise locations corresponding to the presence of flaws which entail the need to discard some sections. In all cases, it must be possible to make a perfectly clean cut, this result being achieved by virtue of a high ratio of cutting speed to rate of feed of the wire, the cutting operation being carried out without introducing any permanent deflection and without disturbing the operation of magnetic testing instruments which are located upstream. In particular, the wire is distributed within the machine in such a manner as to be completely free at the moment of cutting and to prevent said wire from being subjected to any axial thrust at the time of shearing.

The present invention is directed to a wire-cutting machine of very simple design which permits the achievement of the objectives mentioned above.

To this end, the wire-cutting machine which is now considered, namely a machine of the type which comprises two shearing components endowed with identical relative movements but in opposite directions and which carries out the cutting of the wire at right angles to its axis, is characterized in that said components are constituted by two rotary cutters mounted on the shaft ends of two driving motors of the impulse or stepping type, said shafts being disposed on each side of the wire to be cut at an opposite angle of inclination with respect to said wire.

Further properties of the wire-cutting machine under consideration will appear from the following description of one exemplified embodiment which is given by way of indication without any implied limitation, reference being made to the accompanying drawings, in which.

Figure 1:
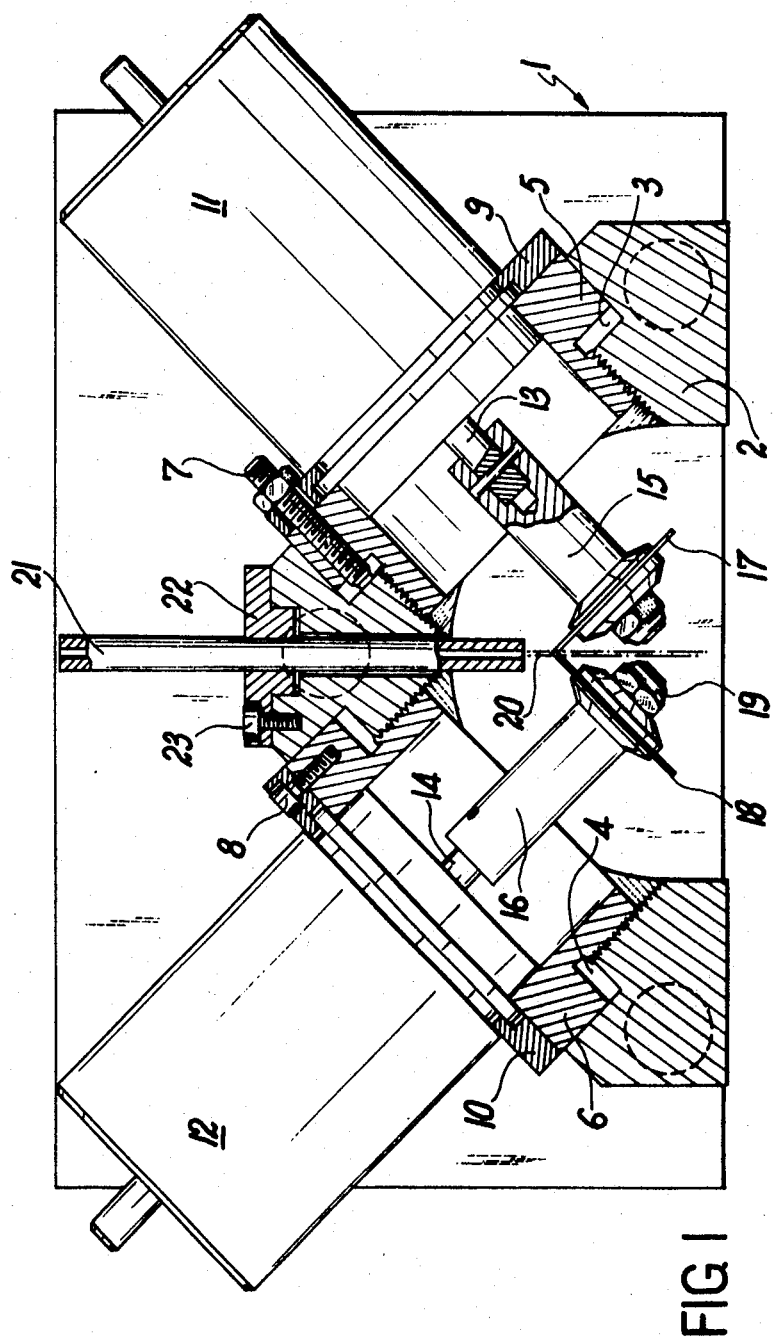
FIG. 1 is a transverse sectional view of a particular embodiment of a wire-cutting machine in accordance with the invention.

As can be seen from FIG. 1, the wire-cutting machine which is illustrated comprises essentially a frame 1 and a supporting member 2 which is attached to said frame and provided with two bores 3 and 4 in symmetrical relation with respect to the central longitudinal axis of the frame. There are mounted within said bores two bushings which are designated respectively by the reference numerals 5 and 6 and on which are stationarily fixed by means of screws 7 and 8 two flanges 9 and 10 for the purpose of positioning the bodies of two electric motors 11 and 12. There are keyed on the shafts 13 and 14 of said motors two hollow shanks 15 and 16 at the ends of which are mounted two cutters 17 and 18 which are secured by means of nuts 19; the constructional detail of said cutters will be explained hereinafter, especially with reference to FIGS. 2 and 3.

In accordance with the invention, the motors 11 and 12 are disposed in the frame 1 so that the direction of their shafts 13 and 14 should make equal and opposite angles with respect to the longitudinal axis of the machine along which the wire 20 to be cut is displaced. As an advantageous feature, the wire 20 which can be of any desired material but especially of metal is guided with respect to the supporting member 2 within a tube element 21 which is rigidly fixed to a ring 22, said ring being secured by means of screws 23. Depending on the nature and diameter of the wire 20, said tube element 21 can be constituted either by a capillary tube or by a cylindrical guide formed of a suitable material such as polytetrafluoroethylene ("Teflon") which is chosen with a view to reducing frictional contact with the wire.

The motors 11 and 12 are preferably permanent-magnet stepping motors of the totally enclosed type which carry out the step-by-step displacement of each cutter 17 and 18 through a predetermined angle, said cutters being driven in opposite directions so as to shear the wire 20 between them. Stepping motors of this type make it possible in particular to obtain very good reproducibility of their angles of rotation and exhibit a static torque which is not zero in the absence of excitation so that they need be supplied with current only at the precise moment of cutting. Moreover, these motors given rise to only limited heating, provide an extremely fast response and permit wide angles of rotation without any ambiguity of positioning. Finally, these motors can readily be employed in open loop, thereby particularly simplifying their assembly and supply.

Figure 2:
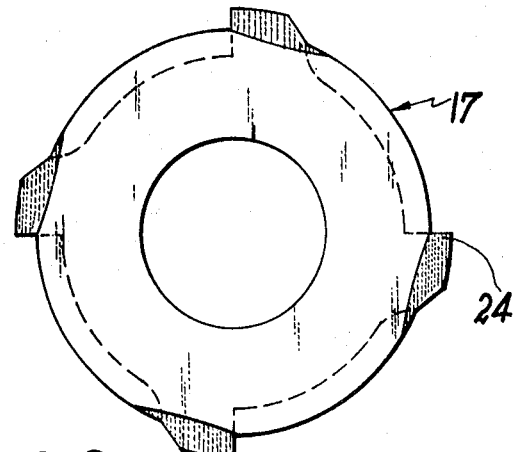
FIGS. 2 and 3 are views in elevation of the cutters which constitute the aforesaid shearing components of the machine.
Figure 3:
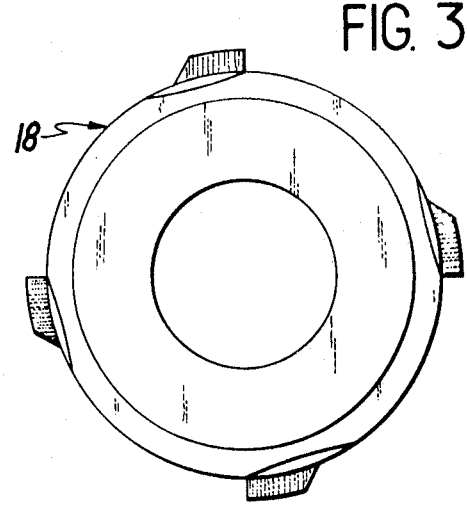
Figure 4:
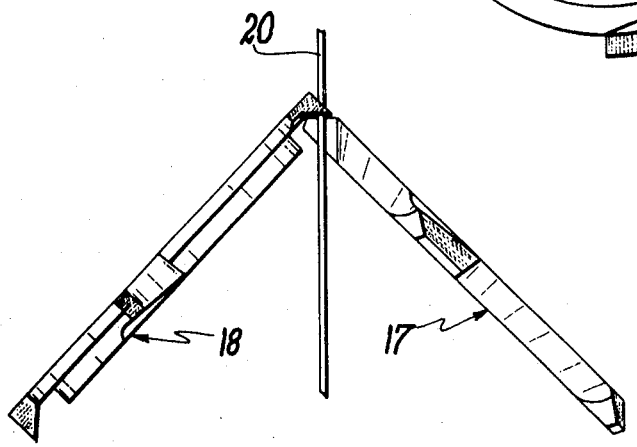
FIG. 4 illustrates more particularly the relative arrangement of said cutters in the machine.

FIGS. 2 and 3 illustrate respectively the profile of each of the two cutters 17 and 18 which are associated with the stepping motors 11 and 12. Each cutter is preferably formed of high-speed self-hardening steel and is provided with a peripheral set of teeth or knives 24 which, depending on whether they form part of either one cutter or the other, either have a re-entrant profile (case of the cutter 17) or a salient profile (case of the cutter 18). As shown in FIG. 4, this makes it possible to shear the wire 20 between any two knives with a cutting plane which is strictly perpendicular to the axis of the wire. These knives 24 are disposed in spaced relation on the cutters so that the angle at which the distance between any two adjacent knives is seen from the center of the cutter is equal to the angle of rotation of this latter under the action of a control impulse which is applied to its driving motor.

Figure 5:
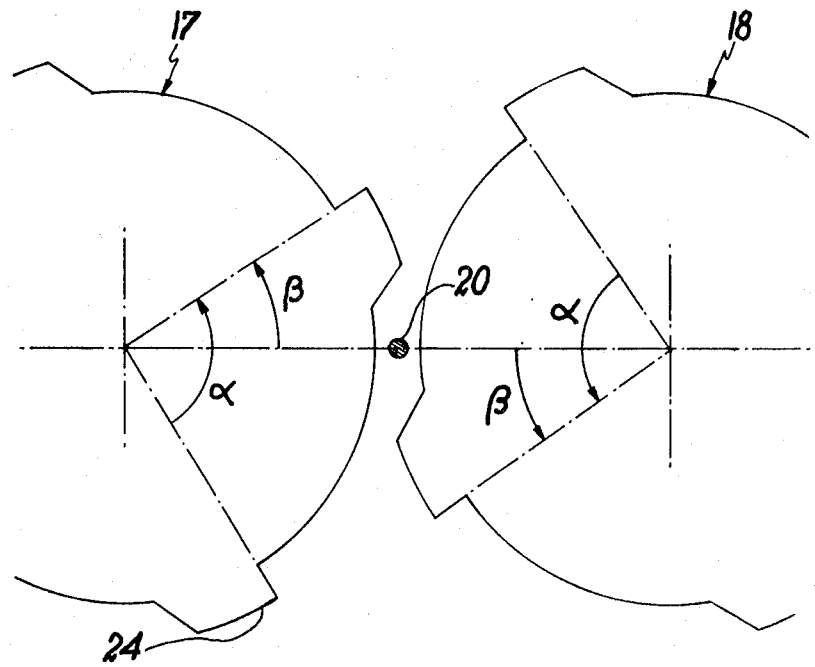
FIG. 5 is a schematic diagram showing the arrangement of the teeth or knives which are provided on each cutter.

In FIG. 5, there is shown diagrammatically the angle $\alpha$ which is thus made between two knives on each cutter. In the case of FIGS. 2 and 3, this angle is chosen equal to 90°, each cutter being accordingly provided with four knives. Each cutter is advantageously endowed with a cutting lead as determined by the angle $\beta$ made by the cutting edge of the knife considered which has just cut the wire with the line which is drawn in the plane of the figure and represents the plane which contains the wire and the axes of both motors. This cutting lead makes it possible in particular to leave a free space between the cutter knives so as to provide the wire with an unobstructed passageway as it is displaced between the cutting periods. Moreover, the cutting lead dispenses with any need for damping of the cutters on completion of their movement of rotation and resultant cutting of the wire, eliminates any dead points and also permits adjustment of the cutting speed.

The wire-cutting machine with rotary cutters which is thus provided makes it possible to produce a prefectly clean cut in a metallic wire. The cutting operation is carried out with an extremely short time of stopping of the wire feed at the moment of shearing, thereby preventing in particular any buckling of the wire on the upstream side. Advantageously, the continuous rate of transfer of the wire is chosen in a ratio in the vicinity of $10^{-4}$ with respect to the peripheral speed of the cutters at the level of the cutter knives.

A few characteristics of a wire-cutting machine as thus constructed are given hereunder by way of indication:

value of the angle $\alpha$: 90°
value of the angle $\beta$: 30°
power of mortors: 100 w.
maximum dynamic torque: 1300 g./cm.
angle of inclination of cutters to axis of wire: 45°
diameter of wire of beryllium-copper alloy: 125$\mu$
angle of cutting edge of knives: 88°
thickness of casing of motors: 8 mm.—mild steel
radius of cutters: 1.3 cm.

As is readily apparent, the invention is not limited in any sense to the embodiment which has been more especially described by way of example and with reference to the accompanying drawings but extends to all alternative forms.

What we claim is:

1. A mechanical cutting machine for cutting a wire at a precise point along its length without thereby subjecting said wire to any longitudinal stress and which comprises two shearing components having identical relative movements but in opposite directions and which carries out the cutting of the wire at right angles to its axis, said components including two rotary cutters mounted on the shaft ends of two driving motors of the stepping type, said shafts being disposed on each side of the wire to be cut at an opposite angle of inclination with respect to said wire, each rotary cutter having a set of knives disposed at the periphery of said cutter, the distance between two successive knives being at a constant angle from the center of said cutter and said angle being equal to the angle through which said stepping motor associated with said cutter carries out a movement of rotation under the action of a control impulse.

2. A cutting machine in accordance with claim 1, wherein each of said knives is displaced on said cutter by a given angle with respect to the position at which it meets the wire and thus provides a lead for cutting of said wire by said knife.

3. A cutting machine in accordance with claim 1, wherein said cutters having separately two types of knives having complementary profiles respectively re-entrant and salient and so arranged as to carry out the cutting of said wire at right angles to its axis.

4. A cutting machine in accordance with claim 1, wherein said motors are fixed in position with respect to a stationary frame comprising a tube element which is disposed between said motors in order to guide said wire.

References Cited

UNITED STATES PATENTS

| | | | |
|---|---|---|---|
| 3,491,636 | 1/1970 | Braun | 83—355 X |
| 3,491,640 | 1/1970 | Poran | 83—497 X |
| 2,753,000 | 7/1956 | Marek | 83—596 |

JAMES M. MEISTER, Primary Examiner

U.S. Cl. X.R.

83—444, 592, 594